United States Patent
Burgio et al.

(10) Patent No.: US 9,446,573 B2
(45) Date of Patent: *Sep. 20, 2016

(54) LUBRICATION BOX FOR A WET SHAVING IMPLEMENT

(75) Inventors: Paul Burgio, St. Paul, MN (US); Janet Coope-Epstein, Norwalk, CT (US); Thomas Follo, Milford, CT (US); Gordon Krauss, Orange, CT (US); Rooma Mehta, Guilford, CT (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/909,015

(22) Filed: Oct. 21, 2010

(65) Prior Publication Data

US 2013/0153135 A1     Jun. 20, 2013

Related U.S. Application Data

(60) Provisional application No. 61/253,537, filed on Oct. 21, 2009.

(51) Int. Cl.

| | |
|---|---|
| *B26B 21/44* | (2006.01) |
| *B29C 39/02* | (2006.01) |
| *B29C 43/14* | (2006.01) |
| *B32B 37/14* | (2006.01) |
| *B29C 43/18* | (2006.01) |
| *B29C 43/36* | (2006.01) |

(52) U.S. Cl.
CPC ............... *B32B 37/14* (2013.01); *B26B 21/44* (2013.01); *B29C 39/025* (2013.01); *B29C 43/146* (2013.01); *B29C 43/18* (2013.01); *B29C 2043/3673* (2013.01)

(58) Field of Classification Search
CPC ..... B26B 21/40; B26B 21/44; B26B 21/443; B29C 39/02; B29C 39/021; B29C 39/023; B29C 39/025; B29C 39/10; B29C 43/02; B29C 43/14; B29C 43/145; B29C 43/146; B29C 43/18; B29C 2043/147; B29C 2043/3266; B29C 2043/3636; B29C 2043/3671; B29C 2043/3673

USPC ................ 156/242; 264/267, 268, 319, 320; 30/34.05, 41, 50, 537

See application file for complete search history.

(56) References Cited

U.S. PATENT DOCUMENTS 4,624,051 A * 11/1986 Apprille et al. ................... 30/50
5,903,979 A *  5/1999 Oldroyd ............................ 30/41

(Continued)

FOREIGN PATENT DOCUMENTS

JP          03-049794 A   *  3/1991
JP          04-309397 A   * 10/1992

(Continued)

*Primary Examiner* — Michael Tolin
(74) *Attorney, Agent, or Firm* — Edgewell Personal Care Brands, LLC (57) ABSTRACT

According to one aspect of the present invention, a lubrication box includes a first portion, a shaving aid material, and a second portion. The first portion of the lubrication box has a skin-engaging surface and at least one sidewall that, together, form a cavity. The skin-engaging surface includes at least two holes therethrough. The shaving aid material is pre-formed in a pre-determined shape, placed in the first portion of the lubrication box, and then compressed. The second portion of the lubrication box is attached to the first portion such that the cavity is substantially closed. A gap exists between in the cavity between the shaving aid and the second portion of the lubrication box to permit the shaving aid material to expand during normal use.

11 Claims, 10 Drawing Sheets

(56) References Cited

U.S. PATENT DOCUMENTS 6,298,558 B1 * 10/2001 Tseng et al. .................. 30/41
2004/0181943 A1 * 9/2004 Kwiecien ..................... 30/41
2009/0223057 A1 * 9/2009 Coope-Epstein et al. ........ 30/41

FOREIGN PATENT DOCUMENTS

JP     06-178877 A   *   6/1994
JP     08-276081 A   *   10/1996

* cited by examiner

LUBRICATION BOX FOR A WET SHAVING IMPLEMENT

CROSS REFERENCE TO RELATED APPLICATIONS

This application claims benefit of U.S. Provisional patent application No. 61/253,537, filed Oct. 21, 2009, incorporated herein by reference in its entirety.

BACKGROUND OF THE INVENTION

1. Field of Endeavor

The present invention is generally directed to a lubrication box for a wet shaving implement in general and, more particularly, to a mechanically assembled lubrication box that provides lubrication during shaving.

2. Background Information

Wet shaving implements generally consist of a shaving cartridge, also commonly known as a razor cartridge, and a handle. The shaving cartridge can be fixedly, or pivotally, attached to the handle. In addition, the shaving cartridge might be affixed to the handle such that, after several uses, a spent shaving cartridge can be replaced with a new shaving cartridge on the same handle. Such handles and shaving cartridges are often referred to as "system razors." Alternatively, the shaving cartridge can be affixed to the handle such that it is not intended to be removed from the handle during normal use and, once the shaving cartridge is spent, the entire shaving implement is discarded and an entirely new shaving implement is used in the now-discarded shaving implement's place. Such shaving implements are often referred to as "disposable razors."

Shaving cartridges generally include a guard, a cap, and at least one blade. Prior art guards are located forward of the blade(s) and acts to flatten and/or pre-stretch the skin prior to encountering the blade. Prior art caps are often located aft of the blade(s) and, in addition to flattening the skin after the skin has been shaved, can also provide lubrication and/or other shaving aids to the recently-shaved skin. Typically, the lubrication and/or shaving aids are provided by a lubrication strip that is affixed to the cap.

In many cases, these lubrication strips utilize two components: a water soluble component that is dispersed throughout a water insoluble matrix. The water insoluble matrix maintains the integrity of the lubrication strip during normal use, permitting water soluble components to dissolve in the water present during normal shaving. Once dissolved in water, the water soluble shaving aid leaches onto the surface to be shaved, providing a shaving benefit. These lubrication strips are typically adhered to or mechanically fastened to the wet-shave razor cartridge.

These forms of lubrication strips have deficiencies. At first, the shaving aid tends to leach superfluously during first few shaves. However, the amount of water soluble shaving aid lessens with each subsequent shave, thereby dissipating and often outlasted by the other components of the razor cartridge. Accordingly, the last several shaves also provide insufficient lubrication to the surface being shaved. Furthermore, current insoluble matrices do not permit complete leaching of all shaving aid, and are thus wasteful.

Other wet-shave razors embed lubrication elements, such as U.S. Pat. No. 5,711,076 to Tseng (hereinafter referred to as "Tseng"), teach a co-extruded core and sheath set-up, where the water soluble core is co-extruded with a water insoluble sheath. The sheath portion of Tseng includes holes through which dissolved core material leaches during normal shaving. However, Tseng, and similar lubrication devices also have deficiencies. These deficiencies include, among others, limited flexibility due to the co-extruded/co-molded manufacturing process; and the fact that the co-molded/co-extruded set-up provides substantially problems when the core swells during normal use.

Accordingly, it is an object of the present invention to provide a lubrication agent and method of manufacture that improves the effectiveness and life expectancy of lubrication agents.

DISCLOSURE OF THE INVENTION

According to one aspect of the present invention, a lubrication box includes a first portion, a shaving aid material, and a second portion. The first portion of the lubrication box has a skin-engaging surface and at least one sidewall that, together, form a cavity. There are at least two holes extending through the skin-engaging surface of the first portion. The shaving aid material is pre-formed and placed into the cavity such that it at least partially fills at least one of the holes in the skin-engaging surface and at least a portion of the cavity. Optionally, a secondary forming process, such as compression, of the shaving aid is performed to correctly position the shaving aid in the first portion. The second portion of the lubrication box is attached to the first portion such that the cavity is substantially closed. A gap exists between in the cavity between the shaving aid and the second portion of the lubrication box to permit the shaving aid material to expand during normal use.

According to another aspect of the invention, a first amount of shaving aid is pre-formed into a pre-determined shape that is generally complimentary to at least a portion of the cavity of the lubrication box, prior to placing the first amount of shaving aid into the first portion of the lubrication box.

According to a further aspect of the present invention, the pre-formed shaving aid can be compressed in the first portion of the lubrication box.

These and other aspects of the present invention are achieved by the apparatus and method of making the present invention disclosed herein. The invention will be clear to one of skill in the art in light of the Detailed Description and Drawings provided.

DETAILED DESCRIPTION OF THE INVENTION

Referring to FIGS. 1, 1A, 1B, and 1C several embodiments of the shaving cartridge 102 of the present invention are shown. The shaving cartridge 102 of the present invention includes at least a frame 104, at least one razor blade 106, and a lubrication box 108.

Figure 2:
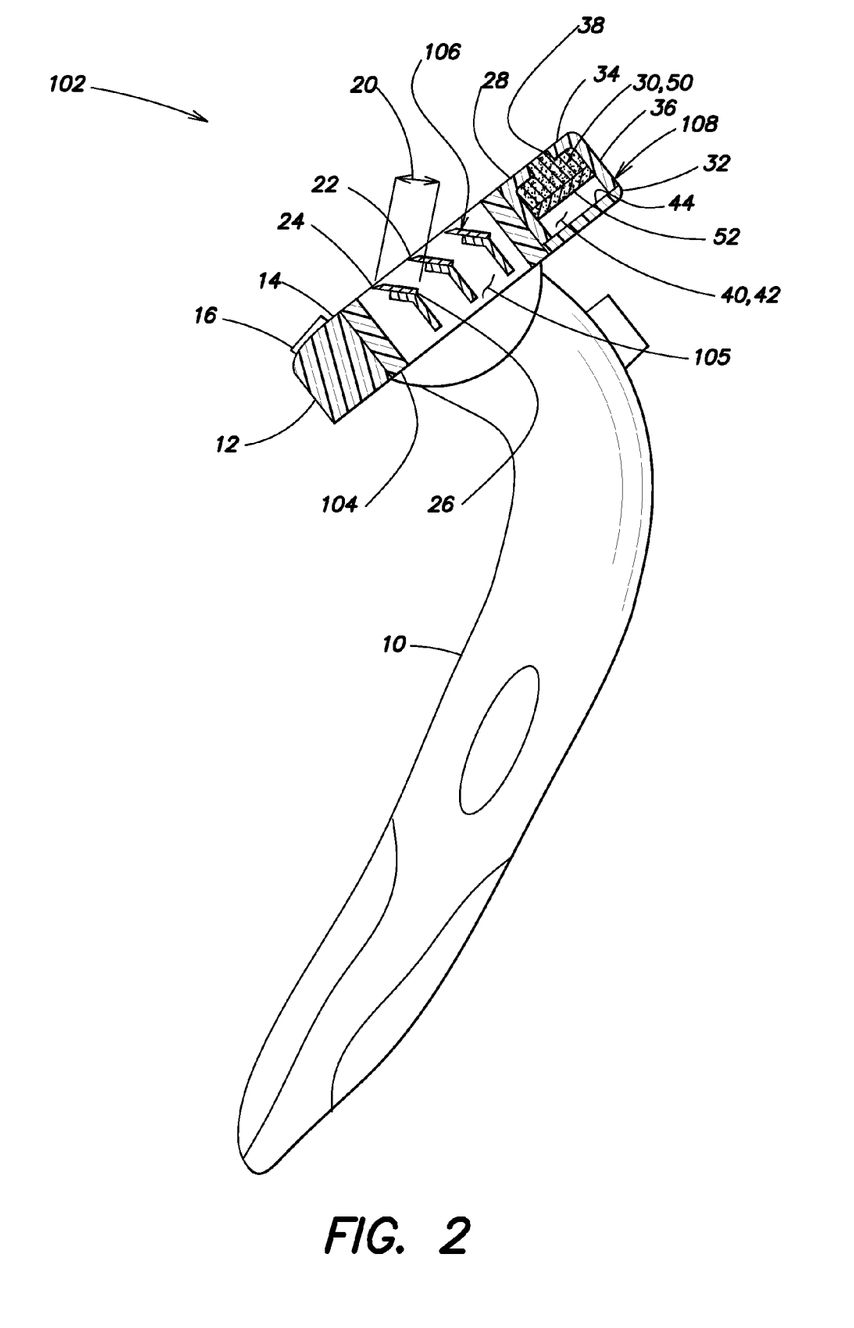
FIG. 2 depicts a cross-sectional view along line II-II of the cartridge of FIG. 1 on a razor handle.

The shaving cartridge 102 of the present invention is often used in conjunction with a handle 10 (see e.g., FIG. 2). The handle 10 is connected to the shaving cartridge 102, either pivotally or fixedly. The handle 10 can be connected to the shaving cartridge 102 in any suitable manner. For example, the handle 10 can be permanently connected to the razor cartridge 102, as is well known in disposable wet shaving implements. Alternatively, the handle can be selectively detachable from the shaving cartridge, as is well known in system wet shaving implements. The handle 10 can be made of any suitable materials and is, typically, ergonomically shaped such that it is easy to hold by the end user during shaving.

The shaving cartridge 102 of the present invention includes a frame 104 and at least one blade 106. The frame 104, which can be made of one or more distinct pieces, typically forms an opening 105 sized to accommodate razor blade(s) 106 (discussed infra.). In some embodiments, such as the one shown in FIG. 1, the frame 104 includes a guard 12 in front of the blades 106. In these embodiments, the guard 12 can be of any suitable type known in the art.

The frame 104 can be made of any suitable material. Molded polymeric materials, or plastics, have proven to be the most effective. The frame 104 is also often either permanently connected to a handle 10 or includes connectors (not shown) such that a user can selectively attach and detach the cartridge from a handle 10.

The guard 12 is, generally, disposed lengthwise on the frame forward of the blades 106 and includes an outer skin-engaging surface 14. The guard 12 may be made of any suitable material known (e.g., rubber) to those of skill in the art and may include additional elements, such as one or more protrusions 16 that flex when in contact with the skin during normal shaving. The guard 12 generally stretches, flattens and otherwise prepares the skin prior to the skin encountering the sharpened blade tips 22. Guards 12 are well known in the art and will therefore not be discussed in detail further herein other than to point out that the present invention is not limited to being used with any particular type of guard 12.

The opening 105 in the frame 104 is sized and shaped to accommodate razor blades 106 positioned therein. Any suitable number of blades 106 (e.g., one, two, three, four, five, six or more) can be positioned within the opening 105 of the frame 104. Generally, the opening 105 is larger in shaving cartridges 102 having more blades 106, and smaller for shaving cartridges 102 having fewer blades 106. Each blade 106 is generally planar and defines a length 18 and a width 20 and is disposed in the opening 105 of the frame 104 such that the sharpened blade tip 22 is appropriately angled for shaving. In embodiments having more than one blade 106, the blades 106 are generally positioned in parallel relation to one another between the front 58 and rear 60 of the frame 104. Each of the blades 106 has a front side 24 and a rear side (not shown) that extend along the length 18 of the blade 106 on opposing sides. A sharpened blade tip 22 extends along at least a portion of a blade 106 width 20 on the front side 24. Each blade 106 is disposed on the frame 104 such that the sharpened blade tip 22 of each blade 106 is located substantially near the shave plane. In other words, the sharpened blade tip 22 of each blade 106 may be substantially contiguous with, slightly above, or slightly below the shave plane. Furthermore, each blade 106 may be mounted on the frame 104 such that the sharpened blade tip 22 is movable relative to the shave plane under forces encountered during normal shaving. For example, in some embodiments, the sharpened blade tip 22 may be located above the shave plane when the shaving cartridge 102 is at rest, but may deflect to a position below the shave plane under the forces on the blade 106 during normal shaving. The location of each blade 106 relative to the shave plane is independent to the location of each of the other blade(s) 106 relative to the shave plane.

Typically, blades 106 are made of flexible material and are supported in the frame 104 to prevent, or at least somewhat inhibit, flexing of the blades 106 during normal shaving. Several manners for supporting the blades 106 are known in the art. For example, in some embodiments, each blade 106 may be welded to a bent blade support (see e.g., FIG. 2) that provides a rigid support structure to the blades 106.

Figure 1:
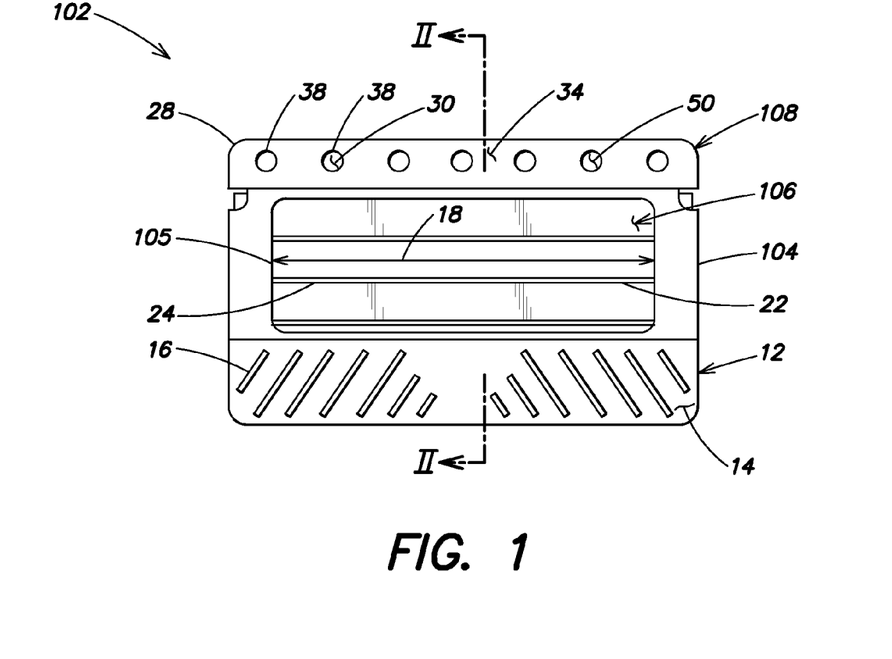
FIG. 1 depicts a front view of one embodiment of a wet shaving cartridge of the present invention.
Figure 1A:
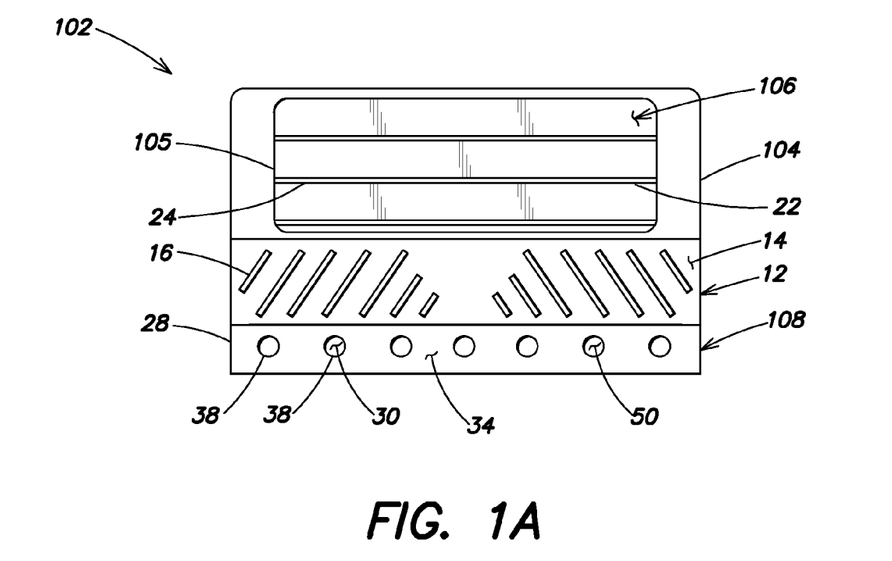
FIG. 1A depicts a front view of another embodiment of a wet shaving cartridge of the present invention.
Figure 1B:
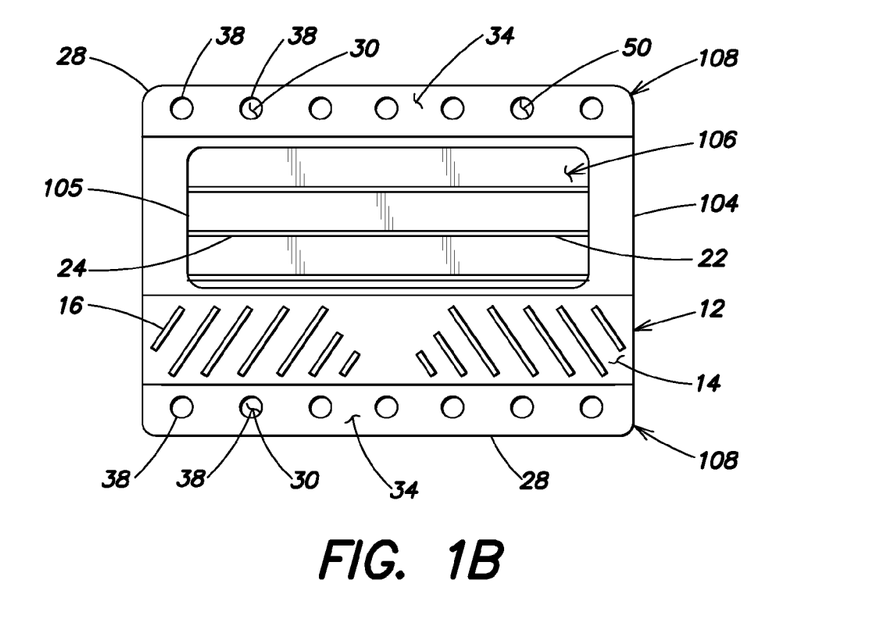
FIG. 1B depicts a front view of a further embodiment of a wet shaving cartridge of the present invention.
Figure 1C:
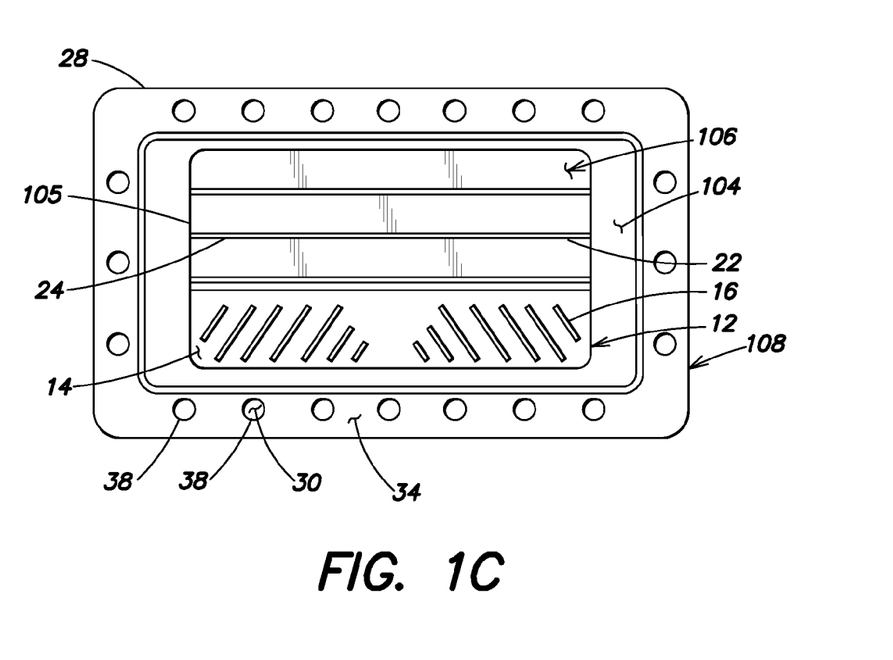
FIG. 1C depicts a front view of an even further embodiment of a wet shaving cartridge of the present invention.

Referring to, e.g., FIGS. 3, 4, 4A and 4B, according to one embodiment of the present invention, a lubrication box 108 includes a first box portion 28, a shaving aid 30, and a second box portion 32. One embodiment of the lubrication box 108 of the present invention is shown, separate from the frame 104, in FIG. 2. The lubrication box 108 is attached to the frame 104, directly or indirectly. For example, as shown in FIG. 1, the lubrication box 108 can be located aft of the blade(s) 106. Or, as shown in FIG. 1A, in other embodiments, the lubrication box 108 can be located forward of the blade(s) 106. In further embodiments, as shown in FIG. 1B, the lubrication box 108 can be located forward and aft of the blade(s) 106. And, in even further embodiments, as shown in FIG. 1C, the lubrication box 108 can substantially surround the blade(s) 106.

Figure 3:
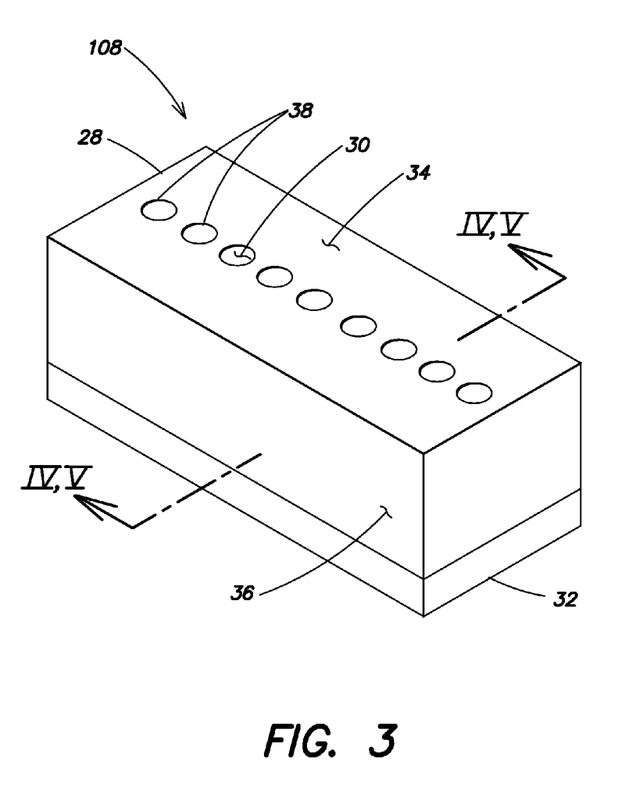
FIG. 3 depicts an isometric view of one embodiment of a lubrication box of the present invention.

One embodiment of the first portion 28 of the lubrication box 108 can be seen in FIG. 3. The first portion 28 includes a skin-engaging surface 34 and at least one side wall 36 that extend(s) from the skin-engaging surface 34 to create a cavity 40. The skin-engaging surface 34 can be of any suitable shape and size and includes at least two holes 38 extending into the cavity. As shown in FIGS. 1, 1A and 1B, the skin-engaging surface 34 can be generally rectangular and is approximately 3 mm in width and approximately 40 mm in length. Alternatively, as shown in FIG. 1C, the skin-engaging surface 34 can be generally oval with a center hole through which a shaving cartridge 102 can pass. However, the present invention is not limited by the shapes and/or size shown and disclosed, and can be of any shape suitable to the designer. Likewise, the at least two holes 38 can be of any suitable size and shape, depending on the needs and wants of the designer. Although the at least two holes 38 are shown in the FIGS. as being in a single row, they can be arranged in any suitable pattern, including multiple rows, and symmetrical and asymmetrical patterns. The first portion 28 can be made of any suitable material, including, but not limited to, plastics, metals, and rubber. Preferably, the entire first portion 28 is a unitary piece made from a single piece of material; however the present invention is not so limited. For example, although not shown, the skin-engaging surface 34 can be made of a different material than the sidewall(s) 36.

The sidewall(s) 36 extend from skin-engaging surface 34 to create a cavity 40. As shown, for example, in FIGS. 1-1C, the sidewall(s) 36 can extend generally at a right angle to the skin-engaging surface 34, but one of skill in the art recognizes that the present invention is not so limited. For example, the skin-engaging surface 34 could gently transition into the sidewall(s) 36 via a smooth curve so that the edge of the lubrication box 108 gently flattens to the user's skin during normal shaving. The sidewall(s) 36 can be of any suitable height, depending on the needs and wants of the designer. As shown in FIGS. 2 and 3, the sidewall(s) 36 are approximately 4 mm in height, creating a cavity 40 that has a volume of approximately 480 mm$^3$, not including the volume of the at least two holes 38.

Figure 3A:
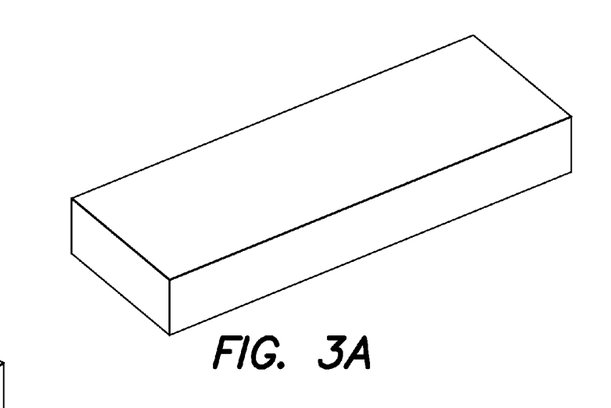
FIG. 3A depicts an isometric view of one embodiment of the first amount of shaving aid, pre-formed.
Figure 3B:
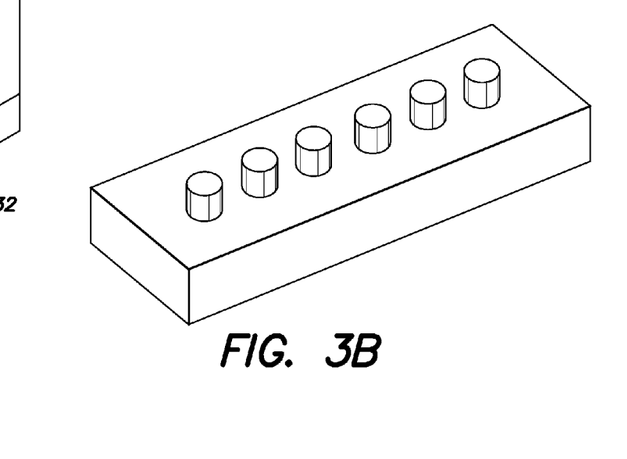
FIG. 3B depicts an isometric view of another embodiment of the first amount of shaving aid, pre-formed.
Figure 4:
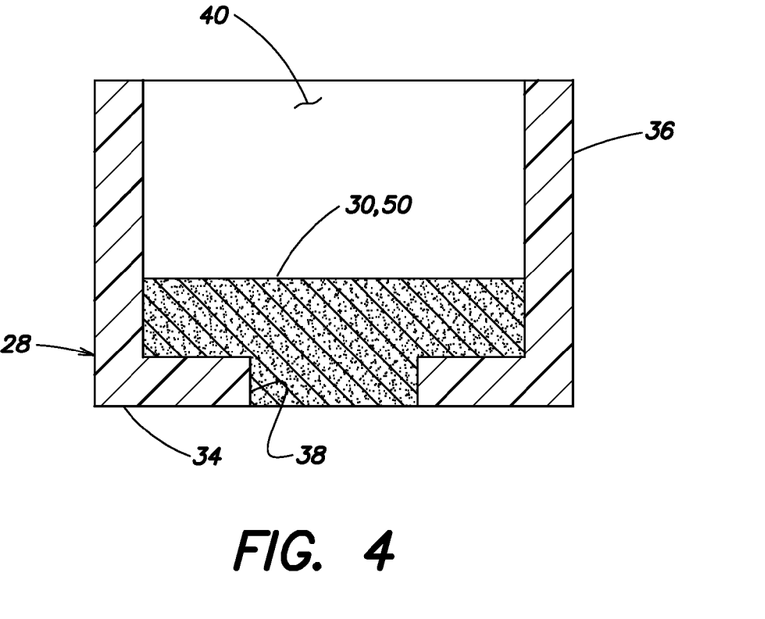
FIG. 4 depicts a cut-away view along line IV-IV of the first portion of the lubrication box of FIG. 3 with a first layer of shaving aid therein.
Figure 4A:
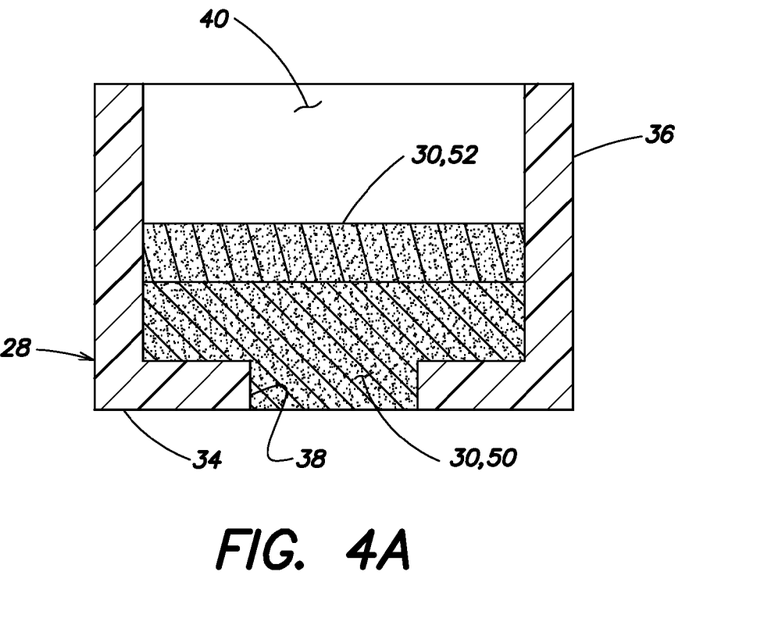
FIG. 4A depicts a cut-away view along line IV-IV of a second layer of shaving aid in the first portion of the lubrication box of FIG. 4.
Figure 4B:
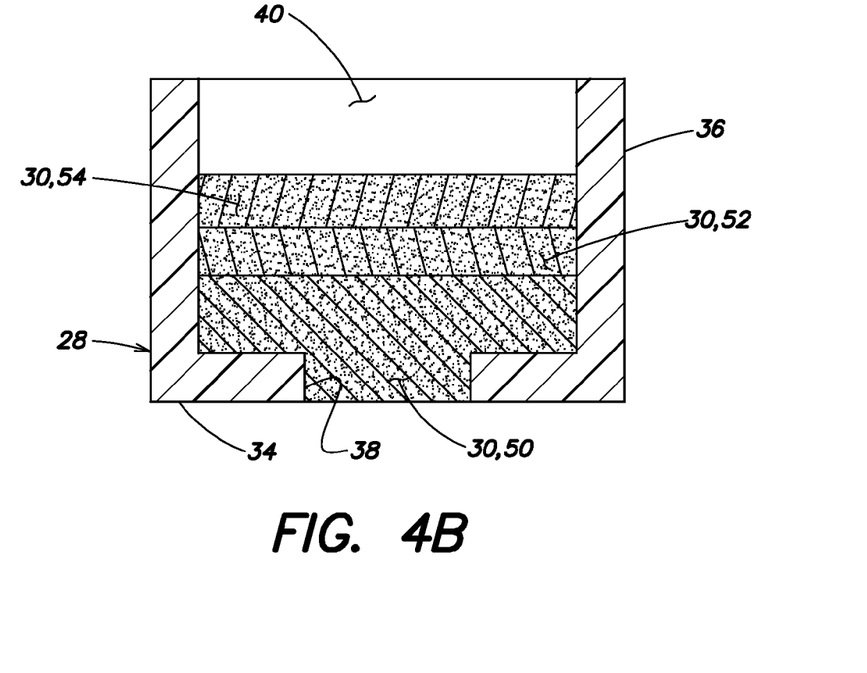
FIG. 4B depicts a cut-away view along line IV-IV of a third layer of shaving aid in the first portion of the lubrication box of FIG. 4A.

Referring to FIG. 3A and 3B, a first amount of shaving aid 50 is preformed via any known means into a shape that is at least generally complimentary to a portion of the cavity of the lubrication box. For example, the first amount of shaving aid can be extruded, molded or poured into the pre-determined shape. In some embodiments, depending on the pre-forming method chosen, it may be desirable to include features 39 that are generally complimentary to the shape and size of the holes 38 in order to create a better fit when the first amount of preformed shaving aid material 30 is placed in the first portion of the lubrication box 28.

The pre-formed shaving aid amount of shaving aid 30 is then positioned into the first portion 28 of the lubrication box 108 such that the shaving aid 30 fills at least a portion of the cavity 40 and, preferably, such that a portion of the first amount of pre-formed shaving aid 30 substantially fills at least one of the holes 38. Optionally, the pre-formed shaving aid 30 is then compressed via a piston 48 to more tightly and compactly fill the one or more holes 38 of the first portion of the lubrication box 28 and at least a portion of the cavity 40, forming the first layer of shaving aid 50. Even more preferably, the first layer of shaving aid 50 substantially fills all of the holes 38. And, most preferably, the first layer of shaving aid 50 completely fills all of the holes 38. The compaction of the material further frictionally locks the first layer of shaving aid 50 into the desired position (i.e., in at least a portion the holes 38 and the portion of the cavity 40 adjacent the holes 38).

Alternatively, although not shown, the first amount of shaving aid 30 can also be (injection) molded directly into the first portion of the lubrication box 28.

The shaving aid 30, preferably, includes 100% water soluble shaving aid materials, although water insoluble shaving aid materials are acceptable. For example, the shaving aid 30 can include any substance that enhances shaving performance. It may, for example, improve shaving comfort (e.g., by lubricating the skin, improve shaving efficiency, condition the beard, or condition the skin). Examples of appropriate shaving aids 30 include lubricous water-soluble polymers such as polyethylene oxide, polyvinyl pyrrolidone, polyacrylamide, hydroxyethyl cellulose, hydroxypropyl cellulose, polyvinyl imidazoline, polyhydroxyethylmethacrylate, poly vinyl alcohol. The preferred lubricous water-soluble polymer is polyethylene oxide. The more preferred polyethylene oxides will preferably have molecular weights of about 100,000 to 8 million, most preferably about 300,000 to 5 million. The most preferred polyethylene oxide comprises a blend of about 40 to 80% of polyethylene oxide having an average molecular weight of about 5 million and about 20 to 60% of polyethylene oxide having an average molecular weight of about 300,000.

The polyethylene oxide blend may also advantageously contain plasticizers. The use of the plasticizers allows the utilization of substantially lower temperatures during the time of processing to produce a flowability of the polyethylene oxide during ultrasonic compressing without substantially reducing its molecular weight. Preferred plasticizers are polyethylene glycol particularly with molecular weight between 400 and 20,000, water soluble polypropylene glycol particularly with molecular weight between 400 and 4,000, water-soluble copolymers of ethylene and propylene oxide, water-soluble aklyl phenol ethoxylates, glycerine, sorbitol and water. Particularly preferred plasticizers are propylene glycol and octyl phenol ethoxylate with 9 moles of ethylene oxide.

Additional ingredients to the shaving aid 30 can include:
A. A lubricating agent for reducing the frictional forces between the skin engaging elements and the skin, e.g., a micro-encapsulated silicone oil.
B. Any additional agent which reduces the drag between the skin engaging elements and the shaver's face, e.g., a non-ionic polyacrylamide; and/or a natural polysaccharide derived from plant materials such as "guar gum."
C. An agent which modifies the chemical structure of the hair to allow the at least one razor blade 106 to pass through the whiskers very easily, e.g., a depilatory agent is one example.
D. A cleaning agent which allows the whisker and skin debris to be washed more easily from the skin engaging elements during shaving, e.g., a silicon polyethylene oxide block copolymer and detergent such as sodium lauryl sulphate.
E. A medicinal agent for killing bacteria, or repairing skin damage and abrasions.
F. A cosmetic agent for softening, smoothing, conditioning or improving the skin.
G. A blood coagulant for the suppression of bleeding that occurs from nicks and cuts.
H. An astringent for constricting blood vessels thereby stemming the flow of bodily fluids such as lymph, which can exude from skin which has been irritated during shaving.

Additional layer(s) of shaving aid 54 can be added to the cavity 40 of the first portion of the lubrication box 28. Preferably, the second layer 52 is pre-formed by any known means prior to placement in the cavity of the first portion of the lubrication box, as well, and then compressed via a piston 48 to ensure proper fit. In some embodiments, a designer may choose to have the subsequent layers 54 included in the lubrication box 102 be generally the same, if not identical, in amount and/or chemical composition to previous layer(s). However, a designer may prefer that a subsequent layer 54 be different than a previous layer in one or more aspects. For example, a subsequent layer 54 may be designed such that it is a different in amount, chemical composition, and/or color than a previous layer. Such a change could be used to provide a varied shaving benefit to the user and/or notify a user that, for example, the lubrication box 108 has almost reached its usable lifespan. The second preformed amount of shaving aid 30 can be preformed using the same, or different method than the first pre-formed amount.

In addition, although not shown, the second pre-formed layer 52 can be (injection) molded directly into the first portion of the lubrication box 28.

Figure 5:
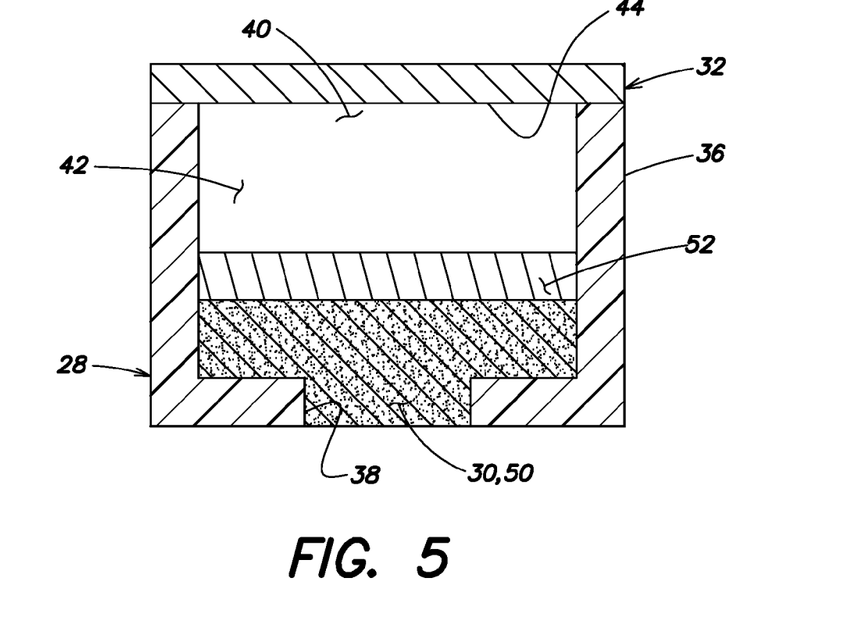
FIG. 5 depicts a cut-away view along line V-V of one embodiment of a second portion of the lubrication box affixed to the first portion of the lubrication box of FIG. 4A.
Figure 5A:
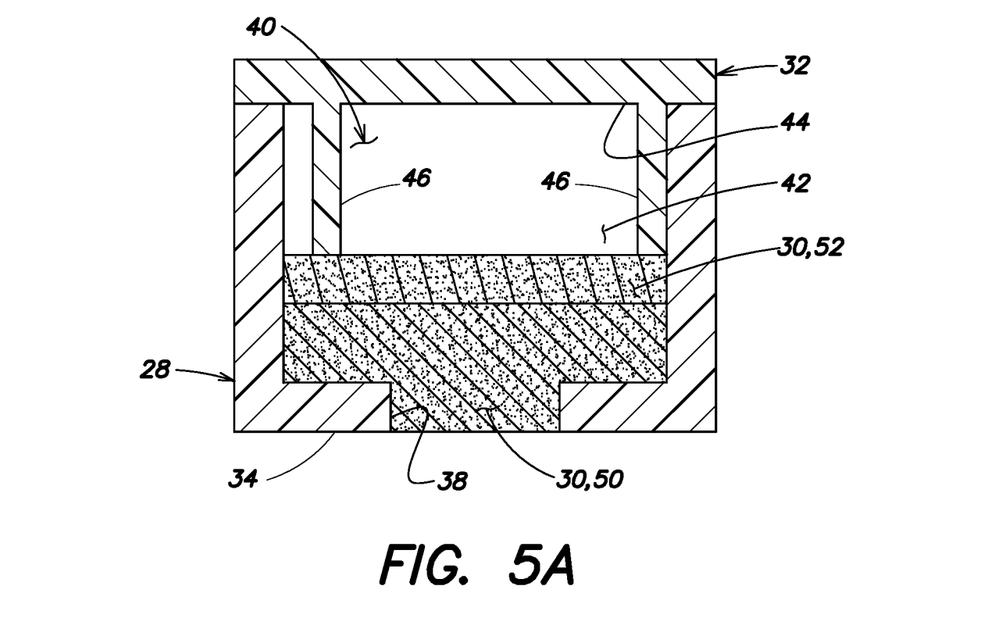
FIG. 5A depicts another embodiment of the second portion of the lubrication box of FIG. 3.
Figure 5B:
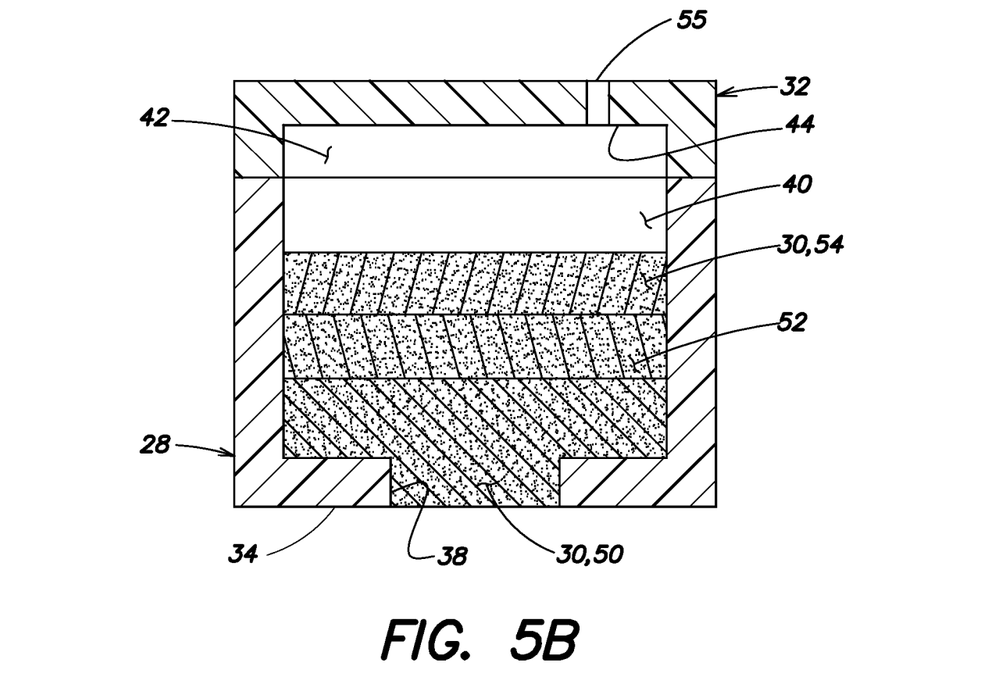
FIG. 5B depicts a further embodiment of the second portion of the lubrication box of FIG. 3.

The second portion of the lubrication box 32, as shown in FIGS. 5, 5A and 5B, is affixed to the first portion of the lubrication box 28, substantially encasing the shaving aid 30 therein. The second portion of the lubrication box 32 can be of any suitable shape and size, provided that the second portion of the lubrication box 32 substantially covers the open end of the cavity 40 formed by the sidewall(s) 36 and skin-engaging surface 34 of the first portion of the lubrication box 28. In addition, the second portion of the lubrication box 32, preferably, is shaped such that a gap exists between the shaving aid 30 and the inner surface 44 of the second portion of the lubrication box 32. The air gap 42 provides space for the shaving aid 30 to expand when wetted. The expansion of the shaving aid 30 can, otherwise, cause an excessive amount of shaving aid 30 to exit through the at least two holes 38 and/or cause the first 28 and/or second portion of the lubrication box 32 to separate from one another, deform and/or crack.

The second portion of the lubrication box 32 can be made from any material; however, it is often preferable for the material to be made of plastic, metal or rubber. The second portion of the lubrication box 32 can be attached to the first portion of the lubrication box 28 in any suitable manner. The most suitable manner for attaching the two portions of the lubrication box 28, 32 often depends on the type of material used. For example, ultrasonically welding the two portions of the lubrication box 28, 32 together has been shown to have particular utility when, for example, the two portions of the lubrication box 28, 32 are made from plastic materials. However, the present invention is not so limited, and the two portions of the lubrication box 28, 32 can be glued or otherwise bonded together. In addition, in some embodiments, a physical connection (e.g., male/female connectors, press fit) is suitable.

The size of the gap between the shaving aid 30 and the second portion of the lubrication box 32 depends on a number of factors, including, but not limited to, the size of the lubrication box 108, and the amount of shaving aid 30 added to the cavity 40. In some cases, a small hole 55 through the first portion 28 or second portions of the lubrication box 32 (see e.g., FIG. 5B) can assist to alleviate the build-up of excessive pressure inside the lubrication box 108 during normal use.

In some embodiments, and specifically referring to FIG. 5A, the second portion of the lubrication box 32 can include one or more additional support features 46 that extend into the cavity 40 that are in close proximity to, or in direct contact with, the shaving aid 30. During use, as water mixes with the shaving aid 30, a portion of the shaving aid 30 begins to dissolve. As more and more shaving aid 30 dissolves, the compacted shaving aid 30 will often, undesirably, become dislodged from its position in the cavity 40. The support feature(s) 46 tend to hold the shaving aid 30 forwards in the cavity 40 in close proximity to the at least two holes 38, where the shaving aid 30 is most likely to mix with water and provide the maximum shaving benefit to the skin during normal use. The support features 46 can be located adjacent the side wall(s) 36, and/or away from the side wall(s) 36 and towards the center of the cavity 40. Preferably, the support feature(s) 46 provide support for the shaving aid 30 at several locations within the cavity 40.

One method of making the shaving cartridge 102 of the present invention includes, first, providing a first portion of the lubrication box 28. As noted above, the first portion of the lubrication box 28 can be made of any suitable material by any known means (e.g., molding a plastic first portion of the lubrication box 28). The first portion of the lubrication box 28 is placed in a support nest 62.

Figure 6:
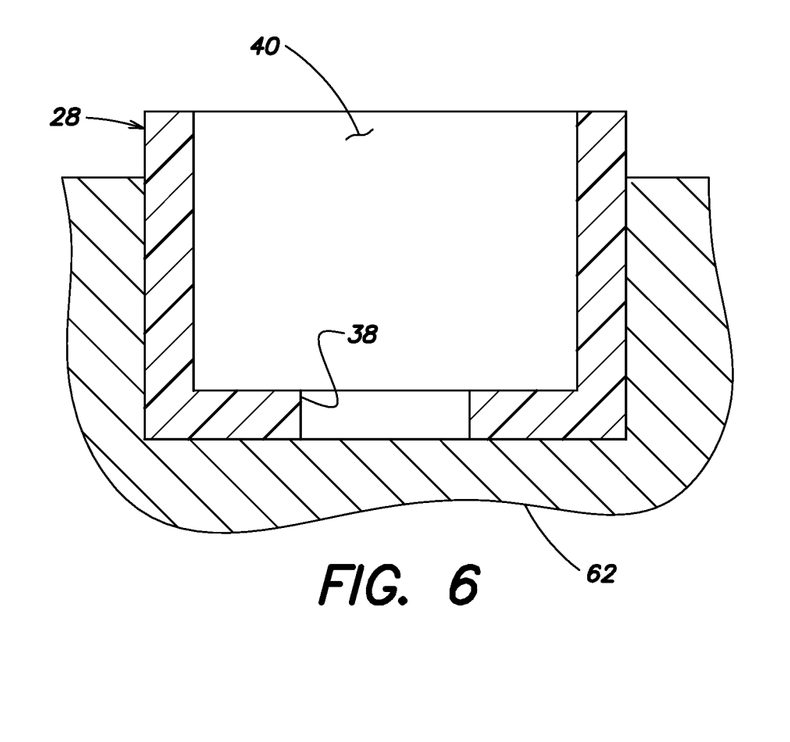
FIG. 6 depicts a step in the method of making a lubrication box.
Figure 6A:
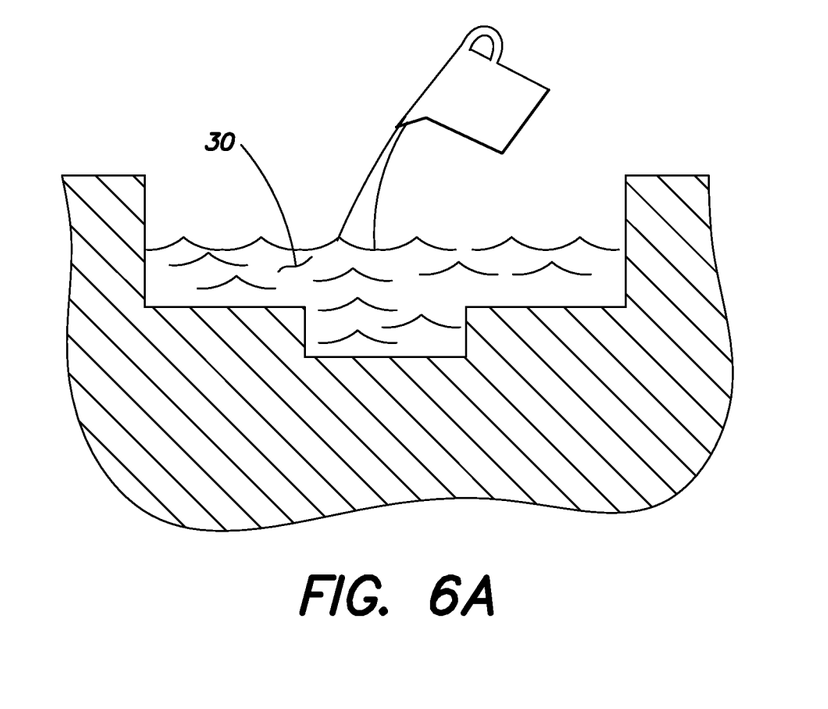
FIG. 6A depicts another step in the method of making a lubrication box.
Figure 6B:
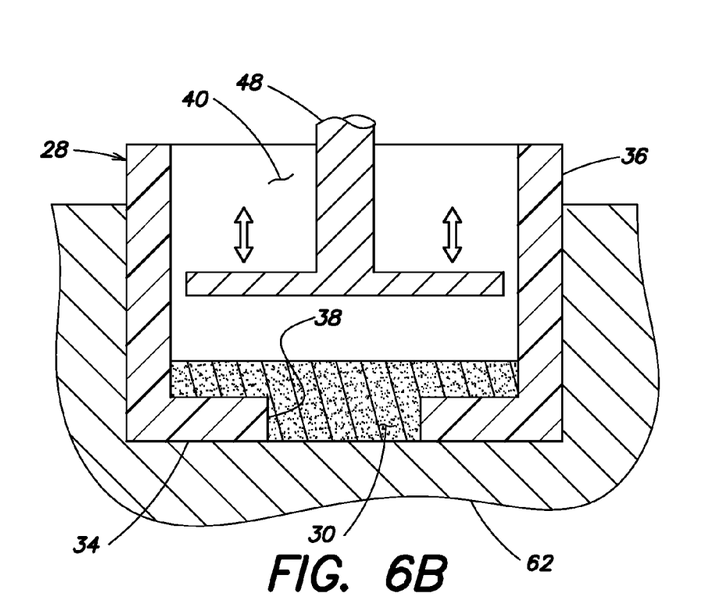
FIG. 6B depicts a further step in the method of making a lubrication box.

A first amount of shaving aid 30 is then pre-formed, via an extrusion, molding, pouring and/or other known forming process and the pre-formed amount of shaving aid is distributed in the cavity 40. Preferably, the first amount of shaving aid is pre-formed at the lowest temperature(s) and pressure(s) achievable, in order to prevent as much degradation of the shaving aid as possible during processing. However, a number of factors dictate the actual temperature(s) and pressure(s) utilized. For example, the actual ingredients, type of process, and desired end product often dictate the actual temperatures and pressures utilized. Also, secondary procedures, as discussed infra., are also factored in. For example, the preformed amount of shaving aid may be kept at a higher temperature during compaction to ensure that the shaving aid is properly compressed into the first portion of the lubrication box (see e.g., FIG. 6B).

Once the first amount of shaving aid 30 is distributed in the cavity 40 of the first portion of the lubrication box 28, a piston 48 then, optionally applies pressure, compacting the shaving aid 30, forming a first layer of shaving aid 50. Optionally, an ultrasonic horn can provide ultrasonic energy to the shaving aid, thereby compacting it further. The actual number of times, length of time, amount of energy and/or amount of force applied to the first amount of shaving aid may vary depending on numerous factors, including but not limited to the amount of shaving aid being compacted, the type of shaving aid being compacted, the actual size and shape of the lubrication box, and the desired level of compaction.

Figure 6C:
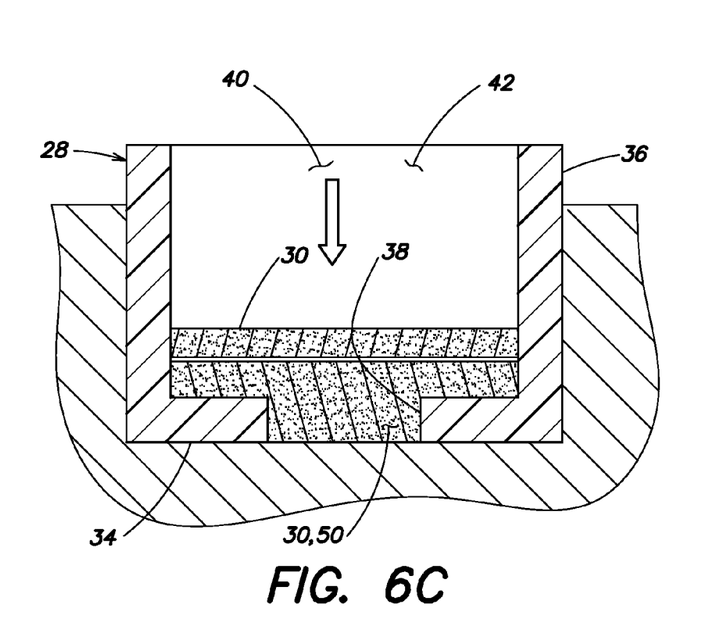
FIG. 6C depicts a further step in the method of making a lubrication box.
Figure 6D:
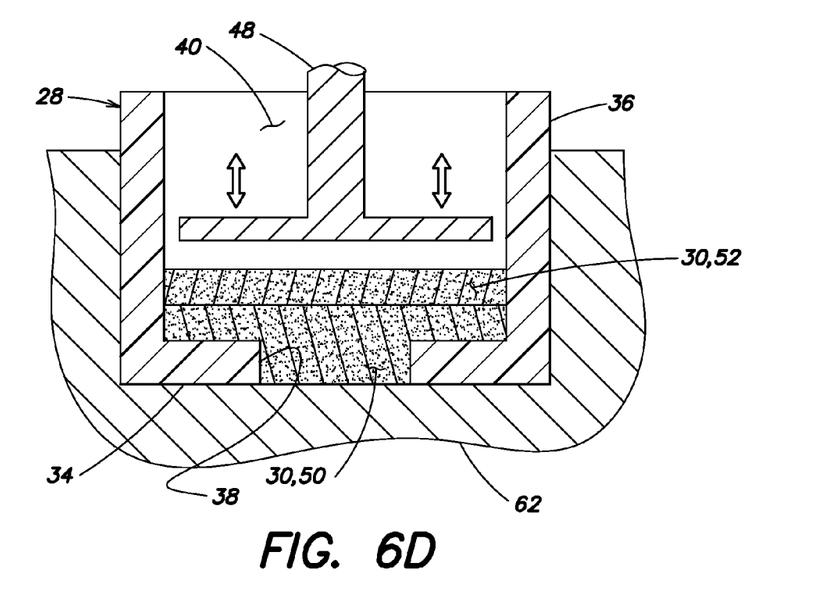
FIG. 6D depicts a further step in the method of making a lubrication box.
Figure 6E:
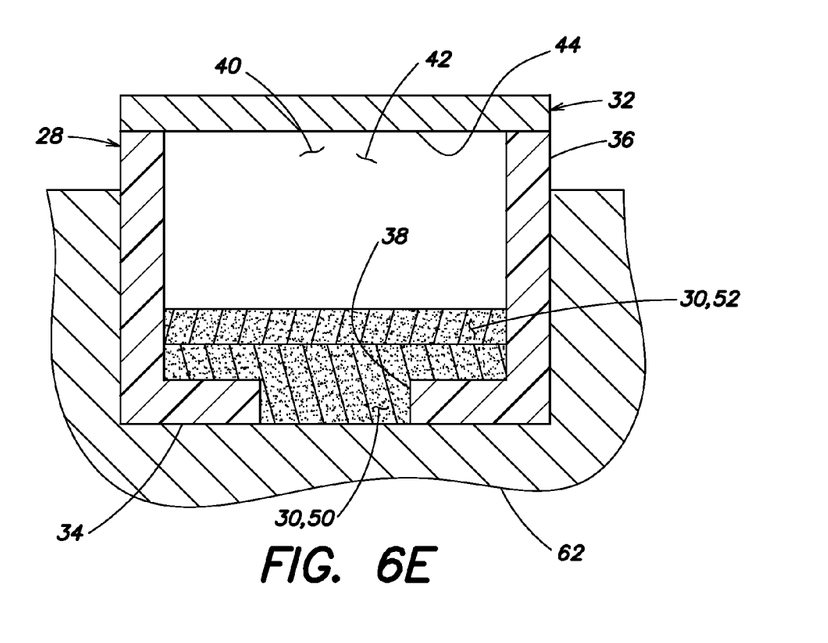
FIG. 6E depicts a further step in the method of making a lubrication box.

Referring to FIGS. 6C and 6D, once the first layer of shaving aid 50 is in place, a second pre-formed amount of shaving aid 30 is, optionally, distributed into the cavity 40 of the first portion of the lubrication box 28. The second amount of shaving aid is also, optionally, compressed/compacted.

Optionally, once the second layer of shaving aid 52 is in place, a third, fourth, or more layers of additional amounts of shaving aid 54 can be distributed and compacted within the cavity 40 of the lubrication box 108.

Once the shaving aid layer(s) 50, 52, 54 are within the first portion of the lubrication box 28, the second portion of the lubrication box 32 is placed on the opening of the cavity 40 of the first portion of the lubrication box 28 and affixed. The lubrication box 108 is then affixed, directly or indirectly, to the frame 104 of the shaving cartridge 102 such that the skin-engaging elements are, or can be, in contact with the user's skin during normal shaving. In some embodiments, the lubrication box 108 is removable and replaceable on the frame 104 of the shaving cartridge 102.

In use, the shaving cartridge 102 is affixed to a handle 10 and a user wets the shaving cartridge 102. The water enters the at least two holes 38 of the lubrication box 108 and mixes with the shaving aid 30. The shaving aid 30, when wet, typically expands, filling at least a portion of the gap 42 within the lubrication box 108. Simultaneously, a portion of the shaving aid 30 dissolves in the water, and exits through the at least two holes 38. The shaving cartridge 102 is then put into contact with the user and drawn across the skin. The blade(s) 106 of the shaving cartridge 102 shave the hair as the now-dissolved shaving aid 102 is distributed on the skin, providing a benefit.

Only some embodiments of the present invention have been illustrated in the drawings, but it should be pointed out that many other modifications are conceivable within the scope of the following claims.

What is claimed is:

1. A method of making a lubrication box for a shaving cartridge having a frame and at least one blade, the method comprising:
    providing a first portion of the lubrication box, the first portion having a skin-engaging surface and at least one sidewall that forms a cavity, the skin-engaging surface having at least two holes therethrough;
    pre-forming a first amount of shaving aid into a pre-determined shape;
    placing the pre-formed first amount of shaving aid into the cavity of the first portion of the lubrication box;
    compressing the first amount shaving aid to form a first layer of shaving aid such that the first layer fills at least a portion of one of the holes;
    providing a second portion of the lubrication box that covers an open end of the cavity of the first portion such that a gap remains between the compressed shaving aid and an inner surface of the second portion of the lubrication box, wherein the lubrication box is attachable to the shaving cartridge such that the lubrication box does not share any common parts with the frame or at least one blade; and
    affixing the second portion of the lubrication box to the first portion of the lubrication box.

2. The method of making a lubrication box of claim 1, wherein the step of pre-forming the first amount of shaving aid includes an extrusion process.

3. The method of making a lubrication box of claim 1, wherein the step of pre-forming the first amount of shaving aid includes a molding process.

4. The method of making a lubrication box of claim 1, wherein the step of pre-forming the first amount of shaving aid includes a pouring process.

5. The method of making a lubrication box of claim 1, further including an additional step of forming a second amount of shaving aid into the cavity of the first portion of the lubrication box and wherein a gap remains between the second amount of shaving aid and the inner surface of the second portion of the lubrication box.

6. The method of making a lubrication box of claim 1, wherein the lubrication box does not contain any razor blades.

7. A method of making a shaving cartridge having a frame and one or more razor blades, comprising:
    making a lubrication box by performing the steps of:
        providing a first portion of the lubrication box, the first portion having a skin-engaging surface and at least one sidewall that forms a cavity, the skin-engaging surface having at least two holes therethrough;
        pre-forming a first amount of shaving aid into a pre-determined shape;
        placing the pre-formed first amount of shaving aid into the cavity of the first portion of the lubrication box;
        compressing the first amount shaving aid to form a first layer of shaving aid such that the first layer fills at least a portion of one of the holes;
        providing a second portion of the lubrication box that covers an open end of the cavity of the first portion such that a gap remains between the compressed shaving aid and an inner surface of the second portion of the lubrication box, wherein the lubrication box is attachable to the shaving cartridge such that the lubrication box does not share any common parts of the frame or razor blades; and
        affixing the second portion of the lubrication box to the first portion of the lubrication box to form the lubrication box; and
    affixing the lubrication box to a frame of the shaving cartridge accommodating one or more razor blades.

8. The method of making a shaving cartridge according to claim 7, wherein the lubrication box is affixed to the frame accommodating one or more razor blades such that said lubrication box is removable and replaceable on the frame.

9. The method of making a shaving cartridge of claim 7 wherein the step of affixing the lubrication box to the frame of the shaving cartridge comprises affixing the lubrication box forward of the blades of the shaving cartridge.

10. The method of making a shaving cartridge of claim 7 wherein the step of affixing the lubrication box to the frame of the shaving cartridge comprises affixing the lubrication box aft of the blades of the shaving cartridge.

11. The method of making a shaving cartridge of claim 7 wherein the lubrication box in the step of affixing the lubrication box to the frame of the shaving cartridge comprises a lubrication box that substantially surrounds the blades of the shaving cartridge.

* * * * *